United States Patent [19]

Kobayashi et al.

[11] Patent Number: 5,010,484
[45] Date of Patent: Apr. 23, 1991

[54] DISC GUIDE MECHANISM FOR AUTOMOTIVE DISC PLAYER

[75] Inventors: Kazuo Kobayashi; Kiyoshi Morikawa; Yoshinori Yamada; Masakazu Kurumada; Masanori Sugihara, all of Saitama, Japan

[73] Assignee: Pioneer Electronic Corporation, Tokyo, Japan

[21] Appl. No.: 501,823

[22] Filed: Mar. 30, 1990

[30] Foreign Application Priority Data

Mar. 31, 1989 [JP] Japan .................... 1-83723

[51] Int. Cl.$^5$ .......................... G11B 3/70; G11B 5/84; G11B 7/26
[52] U.S. Cl. ................... 369/77.2; 360/99.02; 360/99.05; 360/99.06; 369/77.1; 369/75.2; 369/270
[58] Field of Search ............ 369/270, 271, 77.1, 369/77.2, 75.2, 191, 194; 360/99.04, 99.05, 94, 99.02, 99.06

[56] References Cited

U.S. PATENT DOCUMENTS 4,498,162 2/1985 Schatteman .................... 369/77.1
4,507,768 3/1985 Ikedo et al. .................... 369/77.1
4,625,304 11/1986 Kanamaru et al. ............. 369/75.2

FOREIGN PATENT DOCUMENTS 3314400 11/1983 Fed. Rep. of Germany .
3517004 11/1986 Fed. Rep. of Germany .
3643779 7/1988 Fed. Rep. of Germany .

Primary Examiner—Stuart S. Levy
Assistant Examiner—Tien B. Pham
Attorney, Agent, or Firm—Sughrue, Mion, Zinn, Macpeak & Seas

[57] ABSTRACT

A disc reproducing apparatus is disclosed in which a large or small disc inserted through a disc inserting opening is transferred to a predetermined position within a player, a clamper arm extending over a turntable on which the disc is placed is operated to fix the disc onto the turntable, and information recorded in the disc is reproduced by rotating the turntable. A disc guide plate for guiding the small-diameter disc to a clamp position is pivotally mounted to the clamper arm. A disc guiding recess is provided into which the small disc can slip and which has a sufficiently wide opening. A restraining member blocks the advancement of only the large disc into the disc guiding recess. When the small disc is inserted through the disc inserting opening, the small-diameter disc is advanced into the disc guiding recess to be positioned at the clamp position. When the large-diameter disc is inserted through the disc inserting opening, the large-diameter disc is guided by the restraining member to the outside of the disc guiding recess, pushes away the disc guide plate, and is guided to the clamp position on the turntable.

1 Claim, 7 Drawing Sheets

DISC GUIDE MECHANISM FOR AUTOMOTIVE DISC PLAYER

BACKGROUND OF THE INVENTION

This invention relates to a disc player having a disc guide mechanism which, in inserting a disc into the disc inserting opening thereof, operates to position the disc at the center of the disc inserting opening.

Recently, a compact disc has been developed which has a recording layer having pits corresponding to digital signals obtained by converting analog sounds (hereinafter referred merely as "a disc"). With the disc, analog sounds are optically reproduced by using a laser beam applied by the reading head of a CD (compact disc) player. The disc is much superior both in tone quality and in operability to conventional LP record discs. Hence, the compact disc together with its CD player has quickly come into wide use. Accordingly, CD players to be mounted on vehicles have been developed. One example of the automotive disc players is as shown in FIG. 1. In FIG. 1, reference numeral 101 designates a disc of 12 cm in diameter in which pieces of music have been recorded. When the disc 101 is inserted into a disc inserting opening 102, it is conveyed to a predetermined position (which is substantially the center of the CD player) by a loading mechanism 103, where it is fixedly mounted on the turntable 105 by a clamper arm 104. This disc 101 thus mounted is rotated by a spindle motor (not shown), so that the pieces of music are reproduced with a reading head (not shown). In the automotive CD player, the clamper arm 104, the turntable, and the reading head are supported in floating manner so that they are substantially free from vibration during traveling.

On the other hand, a disc 106 of 8 cm in diameter, which is much smaller in diameter than the disc 101 of 12 cm in diameter, has been proposed in the art.

The above-described conventional automotive CD player suffers from the problem that it is rather difficult to insert a disc into the disc inserting opening 102 at the middle, since the width of the opening 102 is wide. Also, a stop portion for positioning the disc is formed for the large disc 101. Thus, when the small disc 106 is delivered to the stop portion, there is a fear that the small disc would run over a predetermined stop position.

This difficulty may be eliminated to some extent by provision of the centering mechanism and a guide plate.

However, since providing the centering mechanism at the disc inserting opening makes the entire mechanism complicated, an alternative solution may be the provision of the centering mechanism on the disc guide plate. The present invention contemplates the aforementioned drawback, and an object of the present invention is to provide a disc reproducing apparatus provided with a disc-guiding device in which the centering mechanism is not required at the disc inserting opening as well as the inserted small and large discs can be accurately guided to the clamp or stop position.

SUMMARY OF THE INVENTION

According to the invention, there is provided a disc reproducing apparatus in which a large or small disc inserted through a disc inserting opening is transferred to a predetermined position within a player, a clamper arm extending over a turntable on which the disc is placed is operated to fix the disc onto the turntable, and information recorded in disc is reproduced by rotating the turntable. A disc guide plate for guiding the small disc to a clamp position is pivotally mounted to said clamper arm. A disc guiding recess into which the small-diameter disc can slip and which has a sufficiently wide opening. A restraining member for blocking the advancement of only the large diameter disc into the disc guiding recess. When the small disc is inserted through the disc inserting opening, the small disc is advanced into the disc guiding recess to be positioned at the clamp position. When the large-diameter disc is inserted through the disc inserting opening, the large disc is guided by the restraining member to the outside of the disc guiding recess such that the large disc pushes away the disc guide plate to be guided to the clamp position on the turntable.

Even if the small disc is inserted into the disc inserting opening with a position thereof being misaligned with the center of the disc inserting opening, when the small disc inserted is transferred toward a position above the turntable, the disc is caught by a disc-guiding recess which is formed on the underside of the disc guide plate pivotally mounted to the clamp arm and serves as a centering mechanism for the disc, so that the disc is guided to the clamp position while also being aligned the center thereof. When the large disc is inserted into the disc inserting opening, the large disc is guided by a restraining member into the disc guiding recess, so that the disc pushes the disc guide plate to abut the stopper, thereby being positioned at the clamp position.

DESCRIPTION OF THE PREFERRED EMBODIMENTS

One embodiment of this invention will be described with reference to the accompanying drawings. FIGS. 2 through 11 show one example of an automotive CD player according to the invention.

Figure 1:
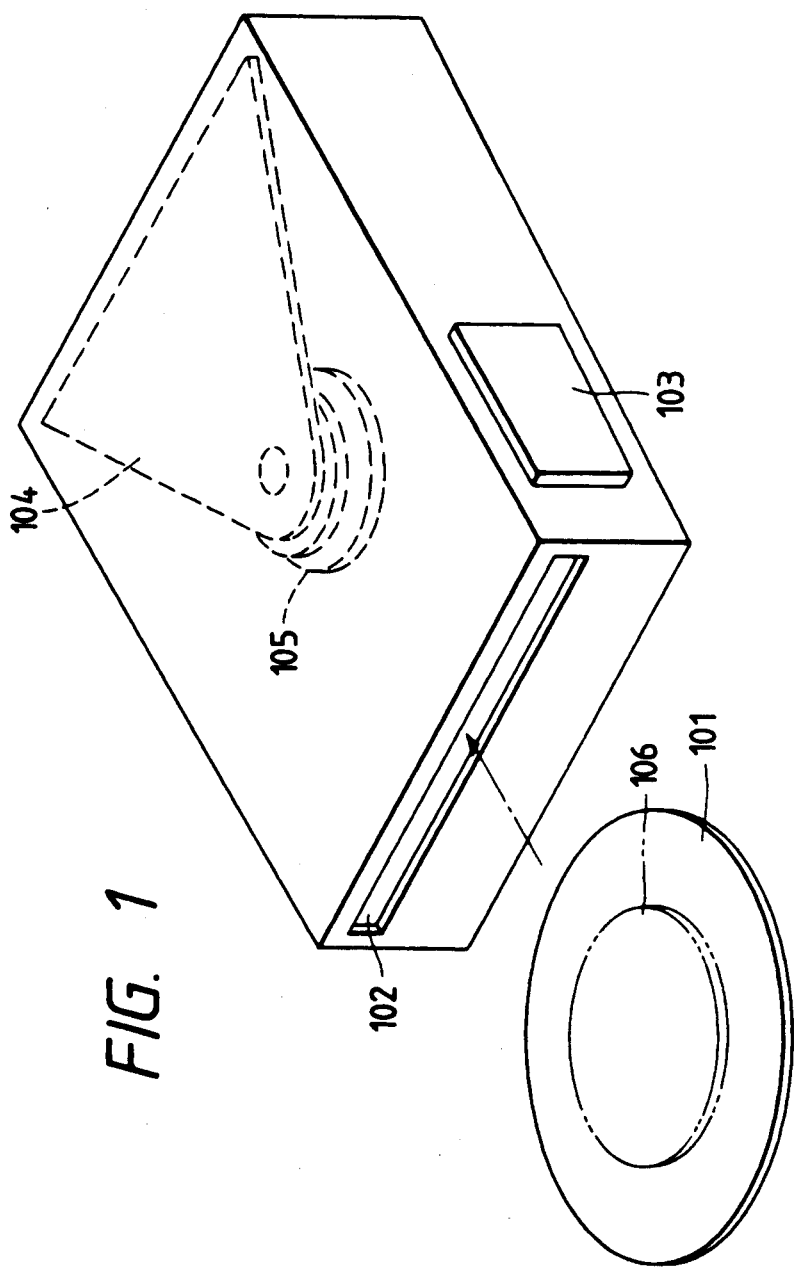
FIG. 1 is a perspective view showing a conventional automotive CD player.
Figure 2:
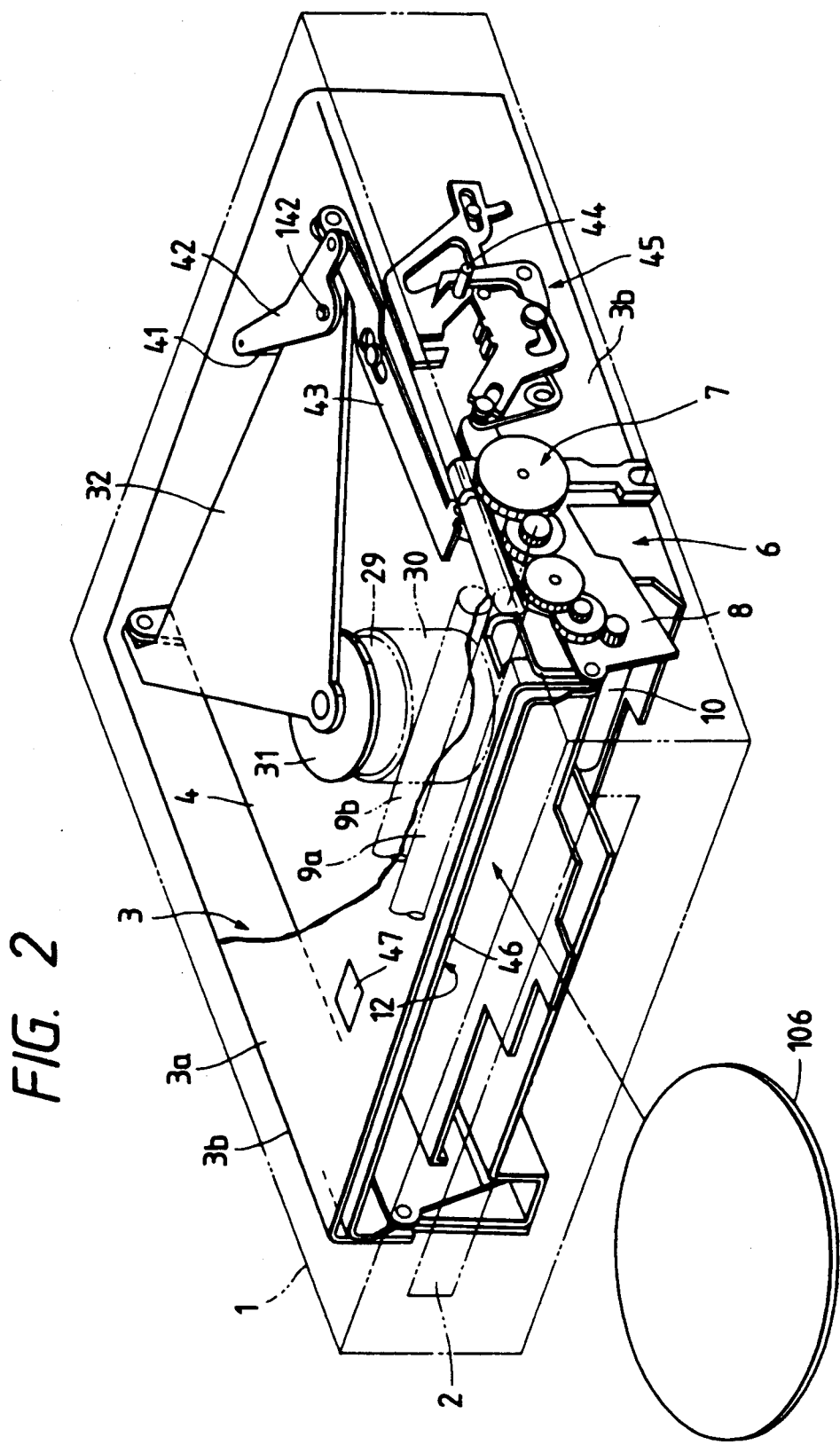
FIG. 2 is a perspective view showing a CD player according to the invention.
Figure 3:
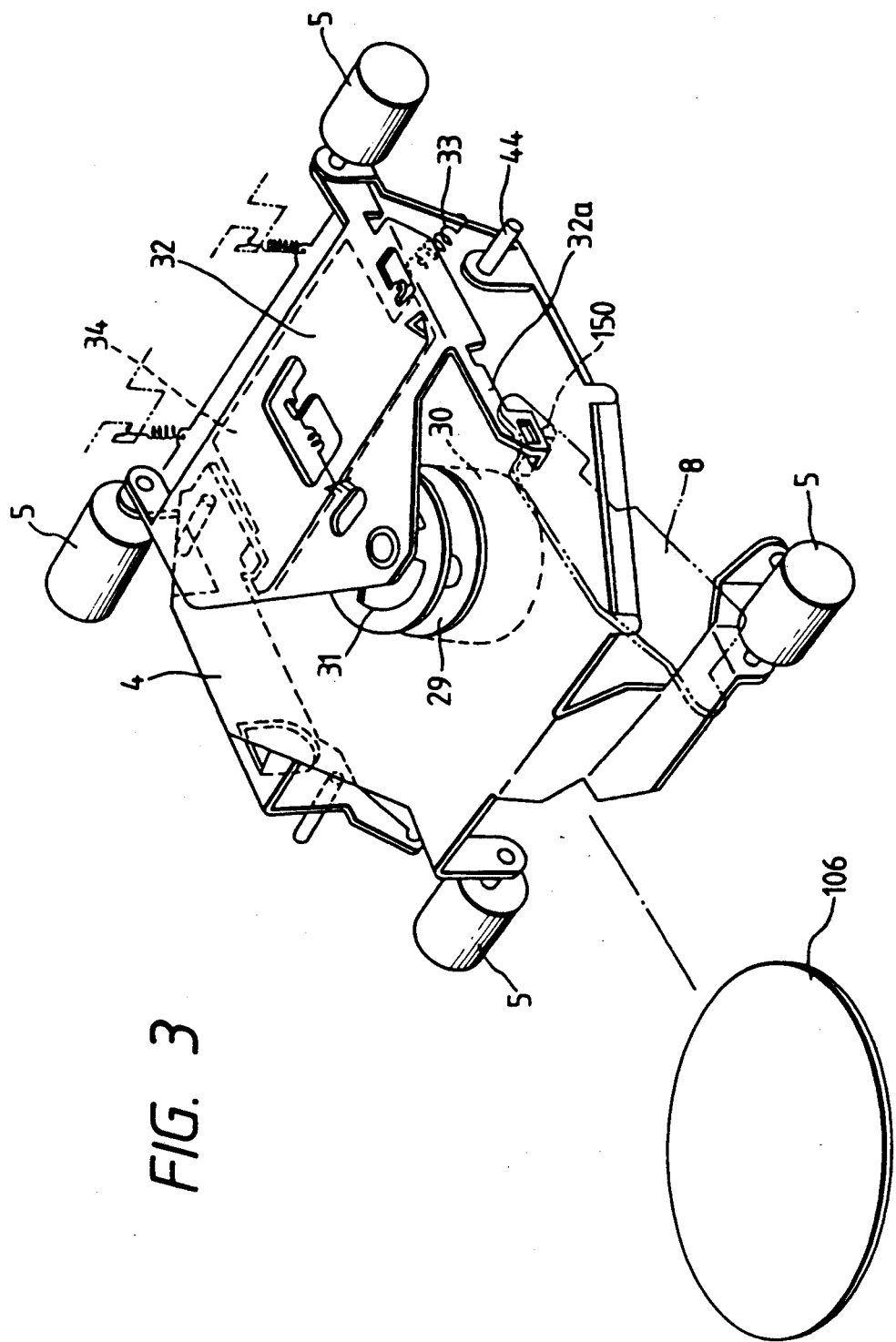
FIG. 3 is a perspective view showing a support frame shown in FIG. 1.

In FIG. 2, reference numeral 1 designates the casing of the automotive CD player according to the invention. A disc inserting opening 2 is formed in the front wall of the casing 1. A frame 3 is provided in the casing 1. The frame 3 is made up of a top plate 3a which is substantially in the form of a flat plate, and side plates 3b and 3b extended downwardly from both ends of the top plate 3a. A supporting frame 4 as shown in FIG. 3 is provided inside the frame 3. A reproducing means (not shown) for reproducing music recorded in discs is mounted on the supporting frame 4 substantially at the center. The supporting frame 4 is supported through dampers 5 by the frame 3 in floating manner. A loading mechanism 6 and a loading arm swing mechanism 7, which are used to move a disc 106 inserted into the disc inserting opening 2 to a predetermined position (substantially the center of the supporting frame 4) are provided through a loading arm 8 on one side of the front end portion of the frame 3. The loading mechanism 6 has a driving roller 9a which is supported by the supporting frame 4. A loading motor 10 is provided in the frame 3 at the front end portion to rotate the driving roller 9a. The driving roller 9a thus rotated delivers the disc 106 inserted into the disc inserting opening 2 to the predetermined position in cooperation with a driven roller 9b engaged with the driving roller 9a.

As shown in FIG. 3, a turntable 29, on which a disc 106 is mounted, is provided on the supporting frame 4 substantially at the center. The turntable 29 is rotated by a spindle motor 30 provided below the supporting frame 4. A small-disc-shaped clamper 31 is arranged over the turntable 29. More specifically, the clamper 31 is coupled to the triangular end portion of a clamper arm 32 which is rockably connected to the rear end of the supporting frame 4. A tension spring 33 is connected between the clamper arm 32 and the supporting frame 4 to urge the clamper arm 32 towards the turntable 29.

Figure 11:
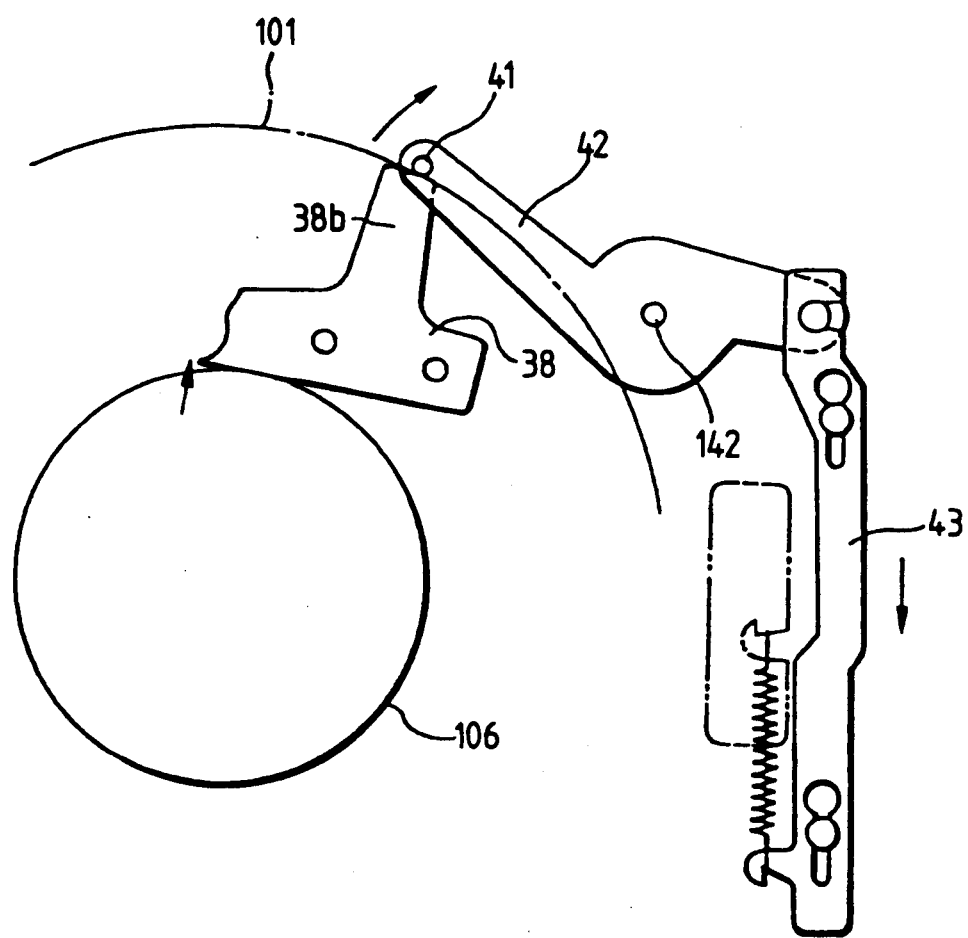
FIG. 11 is a plan view showing a link mechanism.

As shown in FIGS. 4 to 10, a disc guiding plate 34 is pivotally mounted to the clamper arm at the pivot points 130a and 130b on the left and right ends of the clamper arm 32. When the small disc having a diameter of 8 cm is delivered onto the turntable 29, the disc guide plate guides the disc 106 to the clamp position while also causing a detecting pin 41 to activate the pivot mechanism through a link mechanism (FIG. 11). The disc guide plate 34 functions as the disc guiding device and is urged by a leaf spring 140 downwardly.

Figure 5:
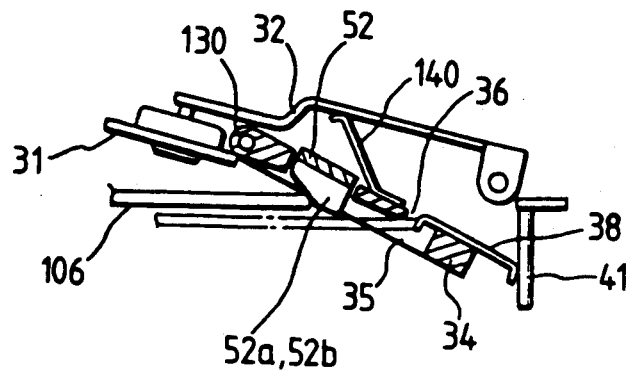
FIG. 5 is a cross-sectional view showing the guide plate of FIG. 1.
Figure 6:
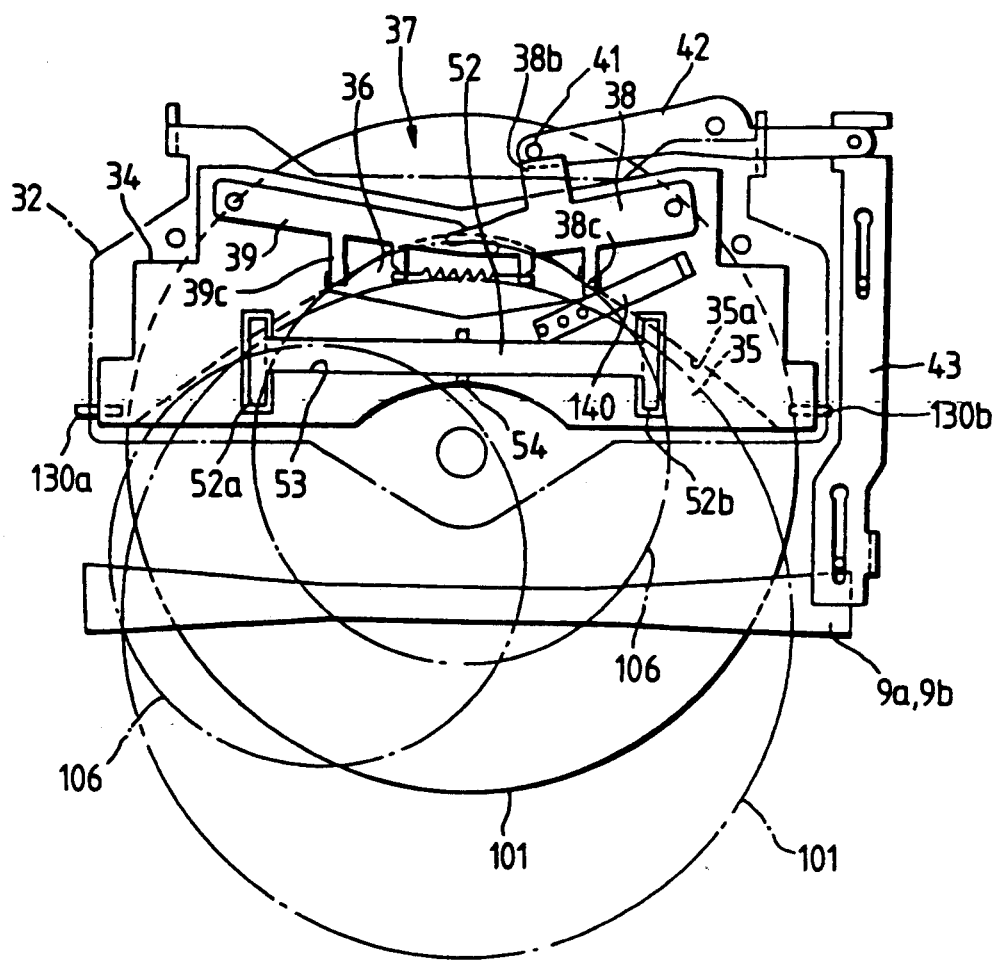
FIG. 6 is a plan view showing the disc guide plate and a pressing auxiliary mechanism.
Figure 7:
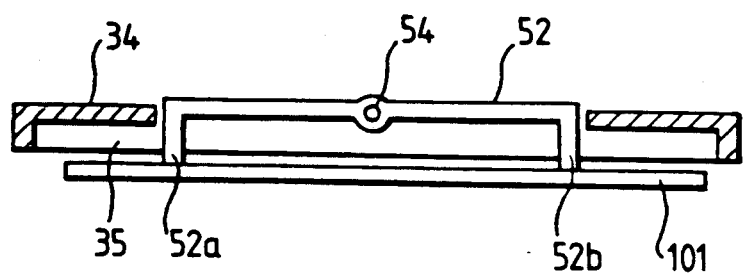
FIG. 7 is a sectional view showing the disc guide plate.

The central portion of the underside of the disc guide plate 34 is formed with a disc-guiding recess 35 which opens to the disc inserting opening 2. The width W close to the disc inserting opening 2 is made sufficiently wide so that the small disc 106 can be received therein. The disc guiding recess 35 is provided with a generally arcuate circumferential wall 35a, and as shown in FIG. 6 the disc guide plate 34 is provided with a swing arm 52 as a restraining member which extends in parallel to the disc inserting opening 2. In other words, an I-shaped groove 53 extends laterally at the middle portion of the disc guiding recess 35 of the disc guide plate 34. An I-shaped swing arm 52 is loosely fitted into the groove 53 and is pivotally supported at the middle portion thereof by the disc guide plate 34 by means of a supporting shaft 54. Each end of the swing arm 52 is folded over toward the disc guiding recess 35 as best shown in FIG. 7 to form legs 52a and 52b the folded lengths of which are increased toward the disc insertion direction as shown in FIG. 5. The legs 52a and 52b of the swing arm 52 are spaced wider than the 8 cm diameter of the small disc 106 and narrower than the 12 cm diameter of the large disc 101.

Figure 8:
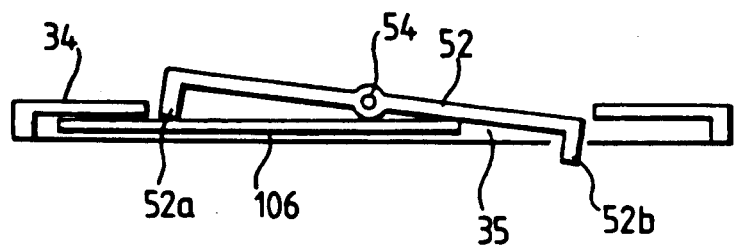
FIG. 8 is a cross-sectional view showing the operation of the disc guide plate.

As shown in FIGS. 6 and 8, if the small disc 106 is inserted being slightly off the middle of the disc inserting opening 2, then the disc 106 is delivered toward the underside of the disc guide plate 34 to abut the tapered left leg 52a of the swing arm 52. Then, the left leg 52a of the swing arm 52 is pushed up by the small-diameter disc 106 to slightly swing clockwise about the supporting shaft 54. For this reason, the small-diameter disc 106 slips into the disc guiding recess 35 without being blocked by the swing arm 52. Since the legs 52a and 52b of the swing arm 52 are spaced apart more than eight centimeters, the small disc 106 inserted into the middle of the disc inserting opening 2 goes between the legs 52a and 52b, without being blocked its advancement into the disc inserting opening 2.

Figure 9:
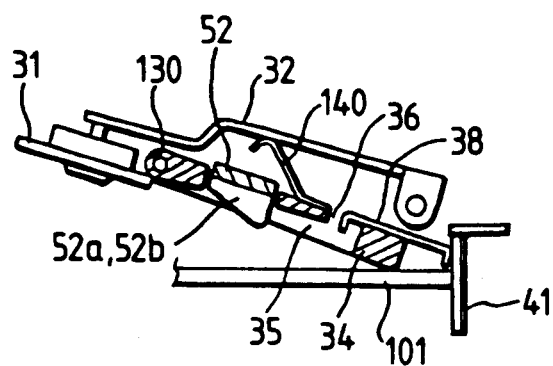
FIG. 9 is a transversal sectional view showing the operation of the disc guide plate.
Figure 10:
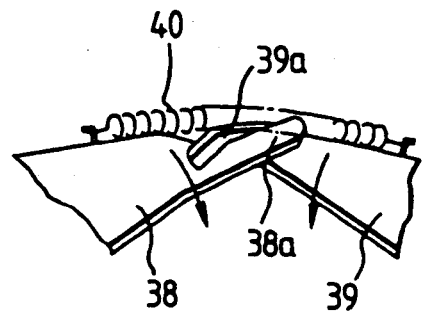
FIG. 10 is an enlarged view showing a part B of FIG. 3.

On the other hand, the large disc 101 is inserted into the disc inserting opening 2, as shown in FIG. 7, the large-diameter disc 101 contacts with the tapered surfaces of the legs 52a and 52b of the swing arm 52. Then, the swing arm 52 does not swing but pushes down the disc 101 by means of the tapered surface of the legs 52a and 52b. Thus, the large disc 101 does not slip into the disc guiding recess 35 but advances thereover as shown in FIG. 9 to cause the disc guide plate 34 to pivot about the pivot point 130 counterclockwise, repelling the guide plate 34.

Figure 4:
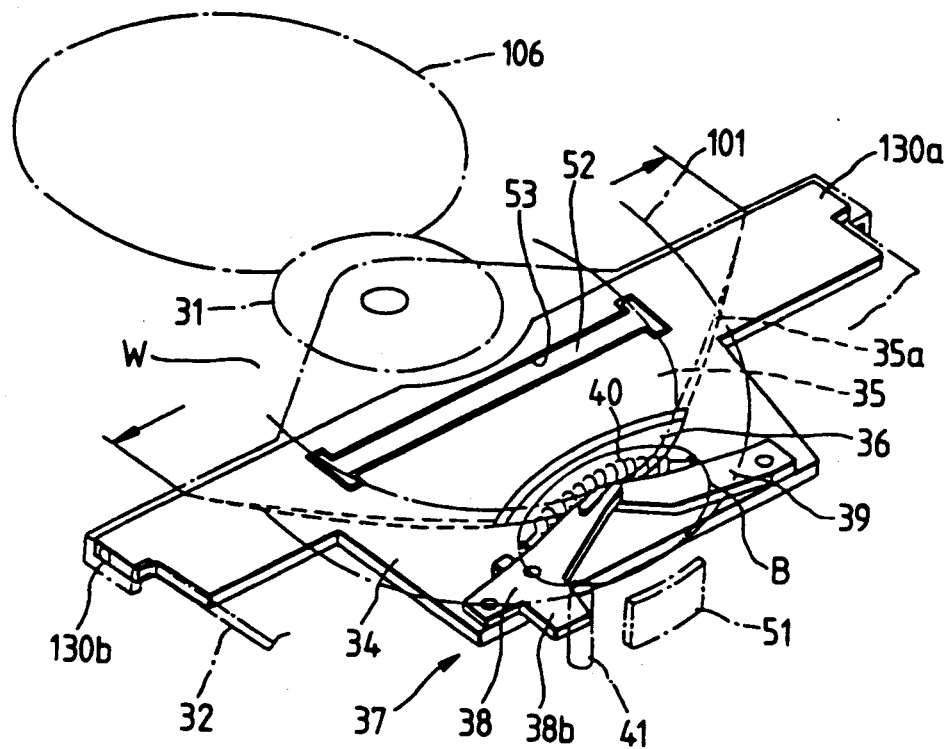
FIG. 4 is a perspective view showing a disc guide plate.

Meantime, as shown in FIGS. 4 and 6 at the rear end of the disc guiding recess 35 is formed a hole 36. The central portion of a depressing assist mechanism 37, which is provided on the top side of the disc guide plate 34, is on the other side of hole 36. As shown in FIG. 5, the front end of the disc 106 slipped into the disc guiding recess 35 abuts the depressing assist mechanism 37 through the hole 36 to cause the mechanism to operate. When the 12-cm diameter disc 101 is delivered onto the turntable 29, the disc 101 pushes up the disc guide plate 34 as shown in FIG. 9, and then directly abuts at the front end thereof the detecting pin 41 to subsequently abut the stopper 51 provided on a support frame 4.

As shown in FIG. 4, the depressing assist mechanism 37 has a pair of pivot arms 38 and 39 which are pivotally mounted at their base ends to the clamper arm 32. The pair of pivot arms 38 and 39 are mounted a tension spring 40 thereto such that the tip ends 38a and 39a engage each other in shake hand relation as shown in FIG. 7. When the small disc 106 takes up the central clamp position on the turntable 29, the tip ends 38c and 39c are pushed by the front end of the disc 106, so that the pair of pivot arms 38 and 39 pivot, respectively.

A projecting strip 38b is continuously integral with the pivot arm 38. A detecting pin 41 is disposed to oppose the projecting strip 38b, and the pivot arm 38 pivots to cause the projecting strip 38b to depress the detecting pin 41.

On the side of the hole 36 of the pivot arm 38 and 39 may be provided projections 38c and 39c such that when the front end of the small disc abuts the projections 38c and 39c, the pivot arms 38 and 39 pivot to move out of their shake hand relation.

As shown in FIG. 11, the detecting pin 41 is mounted to one end of a first link 42 that forms part of a link mechanism pivotally mounted to the rear end of the frame 3. The other end of the first link 42 is connected to a second link 43 slidably disposed in the disc insertion direction. The detecting pin 41 is pushed by the arm 38 if the disc is the small disc 106, and is pushed directly by the disc if the disc is the large disc 101. When the detecting pin 41 is pushed by the disc, the second link 43 is caused to slide for allowing the loading arm pivoting mechanism 7 to operate, thereby lowering the loading arm 8.

As shown in FIGS. 2 and 3, a lock pin 44 is provided on the side wall of the supporting frame 4 and projects therefrom toward the frame 3. A lock mechanism 45 is provided on the side wall of the frame 3 from which the lock pin 44 projects. The lock pin 44 remains locked by the lock mechanism 45 till the inserted disc is transferred to the predetermined position; therefore the supporting frame 4 is fixed to the frame 3. When the loading arm 8 is moved downwardly by the loading-arm pivoting mechanism 7, the lock mechanism 45 unlocks the lock pin 44, causing the supporting frame 4 to be supported with shock absorbing effect on the frame 3 by means of a damper 5.

A movable lid 46 adapted to open and close, is attached to the frame 3 near the disc inserting opening 2. The movable lid 46 takes up a position at the disc inserting opening 2 while the automotive CD player is in use, thereby preventing other discs from being accidentally inserted.

The operation of the disc reproducing apparatus will be described below.

When the disc 106 having a small diameter is inserted into the disc inserting opening 2, a sensor 47 mounted to the front of a ceiling 3a detects the insertion of the disc 106 to cause a loading motor 10 to operate. At this time, as shown in FIGS. 6 and 8, even if the small disc 106 is slightly misaligned to the left of the center of the disc inserting opening 2, as mentioned previously, the disc causes the swing arm 52 to rotate. Since the disc guiding recess 35 has an opening as wide as the disc inserting opening 2. Thus, the small disc 106 is reliably caught by the disc guiding recess 35 to be aligned the center thereof.

When the disc 106 slips into the disc guiding recess 35, the disc 106 abuts the arcuate wall 35a and is guided along the wall to the center of the disc guiding recess 35. The disc 106 guided to the center of the disc guiding recess 35 depresses the detecting pin 41 through the depressing assist mechanism 37 provided on the other side of the hole 36 as shown in FIG. 5. In other words, the disc 106 causes the pivot arm 38 to pivot, thereby the projecting strip 38b depressing the detecting pin 41. When the small disc 106 inserted generally to the center of the disc inserting opening 2, as mentioned previously, the disc 106 advances between the two legs 52a and 52b of the swing arm 52 to be transferred to the center of the disc guiding recess 35.

When the large disc 101 having a diameter of 12 centimeters, the disc 101 is pushed down by the legs 52a and 52b of the swing arm 52 and will not slip into the disc guiding recess 35 but will advance thereover to push up the disc guide plate 34. In other words, the large-diameter disc 101 pushes up the disc guide plate 34, as shown in FIG. 9, against the biasing force of the leaf spring 140 to directly abut the detecting pin 41. Thereafter, the disc 101 abuts the stopper 51 provided on the frame 4.

When the detecting pin 41 is depressed, the first link 42 pivots about the pin 142 as shown in FIG. 11 to cause the second link 43 to pivot, thereby releasing the pin 150 secured to the loading arm 8 to cause the loading arm 8 to operate. Thus, as shown in FIG. 3, as the side projecting strip 32a of the loading arm descends together with the loading arm 8 which is in contact with the strip 32a, the clamper arm 32 descends with the aid of the biasing force of the tension spring 33 to depress and fix the disc 106 placed on the turntable 29 by means of the clamper 31. In this manner, the disc 106 is fixed by the clamper 31; the lock mechanism 45 drivingly cooperates with the loading arm pivoting mechanism 7 to unlock the lock pin 44; and the supporting frame 4 is supported with shock absorbing effect on the frame 3 with the aid of the damper 5; thus the apparatus becomes in floating condition thereof. In this manner, the apparatus becomes ready for reproducing the disc, the spindle motor 30 operates to drive the turntable 29 thus the disc 106 into rotation. When the disc 106 is rotated, a reading head (not shown) emits a laser light to reproduce the music recorded in the disc while moving radially above the disc 106.

As mentioned above, according to the present invention, the disc guide plate is pivotally mounted to the clamper arm; a disc guiding recess has a sufficiently wide opening so that the disc can advance to the disc guide plate. Thus, even if the small disc is inserted with the center thereof being misaligned, the disc can still be accurately guided to the clamp position; therefore, the centering mechanism is not required at the disc inserting opening.

In order to block the advancement of the large into the disc guiding recess, the restraining member is provided for guiding the large disc to the outside of the disc guiding recess. Thus, the large disc pushes away the disc guide plate to abut the stopper, thereby being positioned to the clamp position.

Therefore, regardless of the size of disc, small- or large-diameter, the disc can be reliably positioned through the use of simple construction.

We claim:

1. A disc reproducing apparatus in which a large- or small-diameter disc inserted through a disc inserting opening is transferred to a predetermined position within a player, a clamper arm extending over a turntable on which the disc is placed is operated to fix the disc onto the turntable, and information recorded in the disc is reproduced by rotating the turntable, wherein:

a disc guide plate for guiding the small-diameter disc to a clamp position is pivotally mounted to said clamper arm;

a disc guiding recess into which the small-diameter disc can slip and which has a sufficiently wide opening;

a restraining member for blocking the advancement of only the large diameter disc into the disc guiding recess;

when said small-diameter disc is inserted through the disc inserting opening, said small-diameter disc is advanced into the disc guiding recess to be positioned at the clamp position;

when the large-diameter disc is inserted through the disc inserting opening, the large-diameter disc is guided by said restraining member to the outside of said disc guiding recess such that the large-diameter disc pushes away the disc guide plate to be guided to the clamp position on said turntable.

* * * * *